United States Patent [19]

Sato

[11] 4,334,251
[45] Jun. 8, 1982

[54] TAPE RECORDER HAVING CASSETTE REVERSING DEVICE

[75] Inventor: Masaaki Sato, Hachioji, Japan

[73] Assignee: Olympus Optical Company Limited, Tokyo, Japan

[21] Appl. No.: 157,106

[22] Filed: Jun. 6, 1980

Related U.S. Application Data

[63] Continuation of Ser. No. 952,840, Oct. 19, 1978, abandoned.

[30] Foreign Application Priority Data

| Oct. 20, 1977 | [JP] | Japan | 52-126232 |
| Oct. 20, 1977 | [JP] | Japan | 52-126233 |
| Nov. 14, 1977 | [JP] | Japan | 52-136466 |
| Nov. 14, 1977 | [JP] | Japan | 52-136467 |

[51] Int. Cl.$^3$ ............................................. G11B 15/40
[52] U.S. Cl. .................................... 360/96.6; 360/92
[58] Field of Search ................... 360/74.1, 74.2, 92, 360/93, 96.6, 71, 137

[56] References Cited

U.S. PATENT DOCUMENTS

| 3,603,597 | 9/1971 | Haake | 360/92 |
| 3,722,892 | 3/1973 | Haake | 360/92 |
| 3,833,224 | 9/1974 | Haake | 360/96.6 |
| 3,836,154 | 9/1974 | Ishikawa | 360/92 |
| 4,114,182 | 9/1978 | Zeh et al. | 360/92 |

Primary Examiner—John H. Wolff
Attorney, Agent, or Firm—Toren, McGeady & Stanger

[57] ABSTRACT

A cassette type tape recorder comprises a housing body, a cassette chamber provided therein, a cassette holder for; loading a tape cassette therein, at least one magnetic head, means for driving a magnetic tape provided in the tape cassette, and an urging device for reversing the tape cassette loaded in the cassette holder. This may be accomplished by engaging an eject button to pivot the cassette holder out of the chamber and reengaging the cassette button to rotate the cassette holder 180°.

20 Claims, 19 Drawing Figures

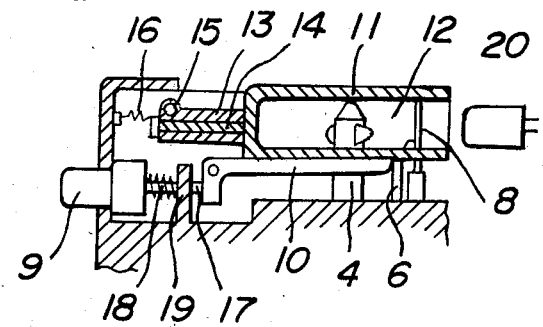
FIG._2a
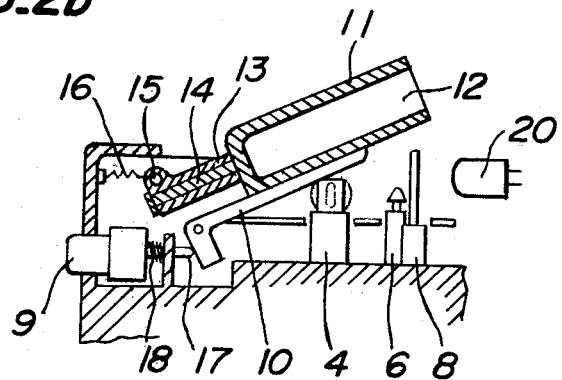
FIG._2b
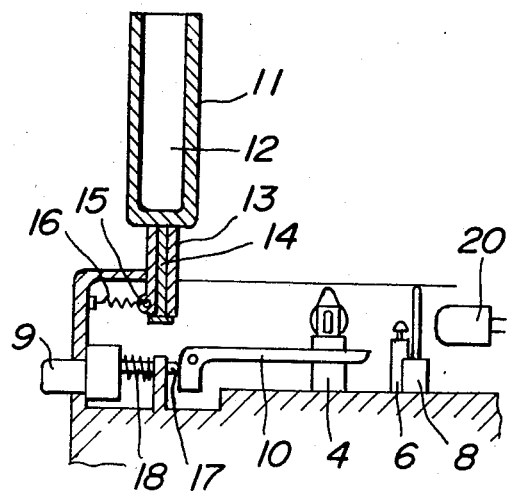
FIG._2c

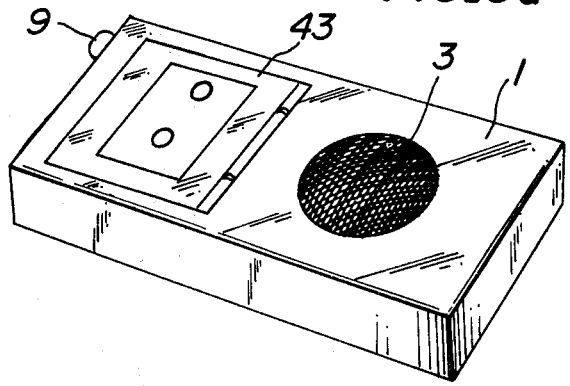
FIG_9a
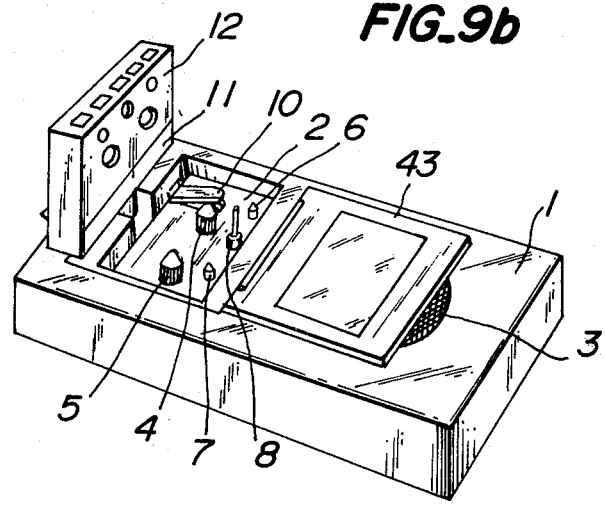
FIG_9b
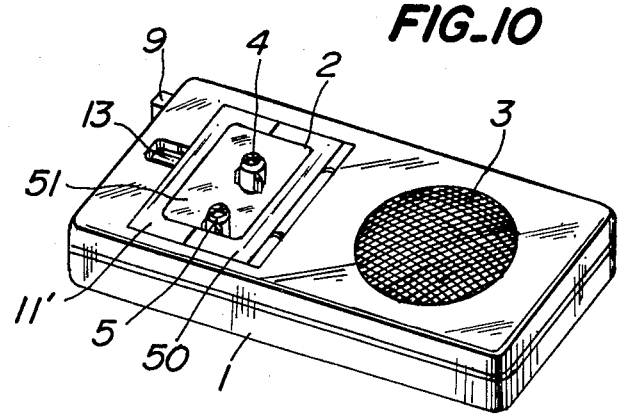
FIG_10

TAPE RECORDER HAVING CASSETTE REVERSING DEVICE

This is a continuation of application Ser. No. 952,840, filed Oct. 19, 1978, now abandoned.

BACKGROUND OF THE INVENTION

The present invention relates to a tape recorder having a reversing device for reversing a tape cassette in a cassette holder of a cassette chamber as loaded in the holder.

For reversing a tape cassette charged, i.e. loaded in a cassette chamber in a tape recorder or the like for reproducing or recording, it is necessary to manually pick up both sides of a cassette or to operate an eject button to raise the cassette from the chamber, to reverse the cassette with fingers, to set it in the cassette chamber again, and to continue reproducing or recording. Further, in using a so-called kangaroo pocket for loading a tape cassette in a cassette holder and setting them in a cassette chamber, it is necessary to raise the holder once, to pick up the cassette from the holder, to reverse and place it in the holder again, and to set them in the cassette chamber. That is, in the above mentioned systems, the cassette is picked up by fingers for reversing it.

However, manual reversal of a cassette is troublesome and a tape is sometimes injured, and in the worst case, the tape cassette itself becomes impossible to use.

On the other hand, in a system in a car stereo or the like, the cassette itself is not reversed but the directions for feeding a tape and the drive positions of a head are changed so as to obtain an equivalent effect to reversal of the cassette. However, such system requires a complicated mechanism for reversing the feeding directions of the tape and an expensive multi-head, and in this case, a solenoid valve and the like are required, so that such mechanism becomes costly and cannot be used in a recently noted superminiature tape recorder in which space is limited.

SUMMARY OF THE INVENTION

An object of the present invention is to eliminate the above mentioned drawbacks.

Another object of the present invention is to provide a cassette reversing device for reversing a tape cassette without touching it with fingers, which is simple in construction and cheap in cost.

A further object of the present invention is to provide a tape recorder having a cassette reversing device, wherein a tape cassette can automatically be reversed with a cassette holder and any dust or the like can be prevented from entering the cassette or the apparatus.

According to the invention, a cassette type tape recorder comprises a housing body, a cassette chamber provided therein, a cassette holder for having a tape cassette loaded therein, at least one magnetic head, means for driving a magnetic tape provided in the tape cassette, and a cassette reversing device for reversing the tape cassette as loaded in the cassette holder. The cassette holder is rotatably provided in a tumble-free bearing in the cassette chamber and at least a drive shaft hole and a capstan hole are bored on upper and lower surfaces of the cassette holder. At least a portion of the cassette holder corresponding to a label portion of the tape cassette is made transparent. The cassette holder is freely inserted into the holder, and said holder is made rotatable by interlocking with operation of an eject mechanism when lifting the bearing. A portion of the cassette holder which makes contact with at least a pair of drive shafts is cut and the cut portion of the holder is closed with a lid, whereby the tape cassette is reversed while loaded the cassette holder.

BRIEF DESCRIPTION OF THE DRAWINGS

FIGS. 2a, 2b and 2c are sectional views showing the states of setting the cassette holder in the cassette chamber, respectively;

FIG. 9a is a perspective view showing a fourth embodiment of the cassette tape recorder having the cassette holder set in the cassette chamber;

FIG. 9b is a perspective view showing the standing state of the cassette holder;

FIG. 10 is a perspective view showing a fifth embodiment of the cassette tape recorder having the cassette holder set in the cassette chamber;

DESCRIPTION OF THE PREFERRED EMBODIMENT

Figure 1A:
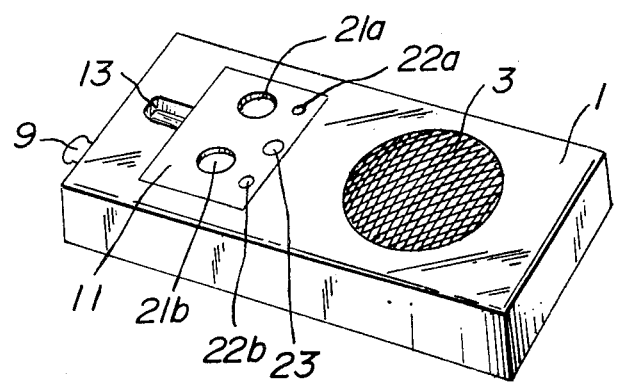
FIG. 1a is a perspective view showing a first embodiment of a cassette tape recorder having a cassette holder set in the cassette chamber.
Figure 1B:
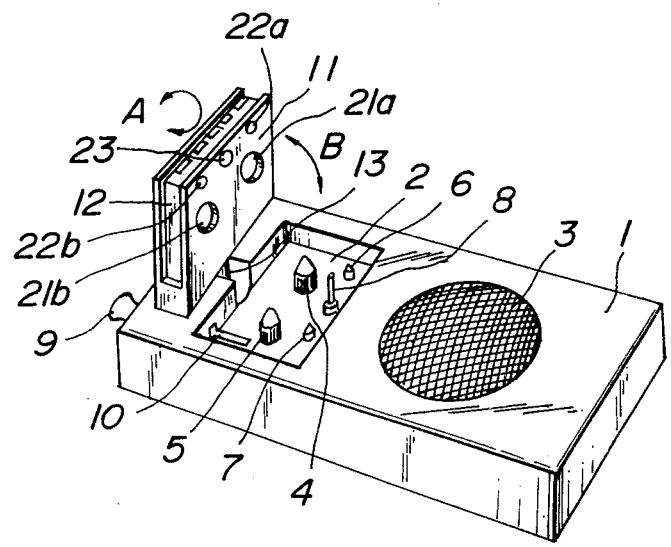
FIG. 1b is a perspective view showing the standing state of the cassette holder.

Referring now to the drawings, wherein same reference characters designate same or corresponding parts throughout the several views, FIGS. 1a and 1b show a first embodiment of a cassette tape recorder having a cassette holder set in the cassette chamber according to the present invention. In FIGS. 1a and 1b reference numeral 1 is a tape recorder main body provided with a cassette chamber 2 and a speaker hole 3.

In the cassette chamber 2 are provided a pair of reel drive shafts 4, 5, cassette guide pins 6, 7 and a capstan shaft 8, and further provided with an eject lever 10 interlocked with an eject button 9.

On the other hand, in the cassette chamber 2 is provided a detachable cassette holder 11. This holder 11 is for receiving and keeping a tape cassette 12.

Figure 3:
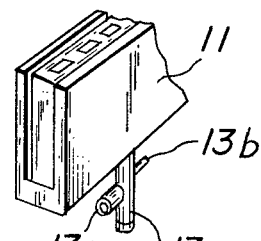
FIG. 3 is a partially perspective view showing a rotary bearing of the cassette holder.

This holder 11 is opened to the inlet of a flat box body and the middle of both side surfaces for sandwiching the flat tape cassette 12 from both surfaces. On both upper and lower surfaces of the holder 11 are bored a pair of drive shaft inserting holes 21a, 21b, a pair of cassette guide pin inserting holes 22a, 22b, and a capstan shaft inserting hole 23 corresponding to the tape cassette 12, respectively. In addition, these inserting holes are formed larger than each inserting hole provided in the tape cassette 12, thereby making the tumbling action of the holder 11 smooth. This holder 11 is supported by a rotary bearing 13, rotated in the direction of an arrow A and tumbled in the direction of an arrow B within the range of about 90°. In this case, the reversing mechanism of the holder 11 is as shown in FIG. 2 in detail. That is, the holder 11 is provided with a shaft 14, and the shaft 14 is inserted into a cylindrical rotary bearing 13 for making its rotation in the direction of the arrow A possible as described above. The rotary bearing 13 is provided with a boss 13a at the end portion as shown in FIG. 3. The boss 13a is pivoted on a pin 15 on the inner wall surface of the cassette main body 1, so that the rotation in the direction of the arrow B, i.e., movement of the holder 11, occurs freely while setting it in the cassette chamber 2 within the range of about 90°. Further, the rotary bearing 13 is provided with a boss 13b for a spring at the end portion as shown in FIG. 3, and a spring 16 is extended between the boss 13b and the inner wall surface of the cassette case main body 1. The spring 16 furnishes a bias force in the standing direction to the rotary bearing 13, and this bias force immediately acts from the point of standing the rotary bearing 13 at a predetermined angle, i.e., the point of exceeding the dead point of the spring 16 shown in FIG. 2b.

On the other hand, the eject button 9 is provided with an operation shaft 17. The shaft 17 is movable in the right direction as illustrated by a push operation of the eject button 9 supported by a bearing 19 through a spring 18. Further, an eject lever 10 is provided in opposition to the end of the shaft 17. This lever 10 is effected on the initial standing force of the holder 11, rotated by the movement in the right direction of the shaft 17 and lifted to the place where the holder 11 is influenced by the predetermined angle, i.e., the bias force of the spring 16.

In addition, in the figure, reference numeral 20 is a magnetic head and made into contact with a tape provided in the tape cassette 12 by sliding in the left direction after the cassette holder 11 is set in the cassette chamber 2.

In such cassette reversing device, the cassette holder 11 is first made to stand and in this state the tape cassette 12 is put in the holder 11. In this case, both side surfaces of the holder 11 are open, so that both sides of the tape cassette 12 are held with fingers and after the cassette 12 is loaded in the holder, the holder 11 is pushed into the cassette chamber 2. In this case, the hole bored in the holder 11 is formed larger than the inserting hole of the tape cassette 12, so that the holder 11 can easily be set in the cassette chamber 2.

In such a cassette reversing device, when the tape cassette 12 is loaded in the cassette holder 11 while standing and the tape cassette 12 is reversed from its setting in the cassette chamber 2 (FIG. 2a), if the eject button 9 is pushed, the eject lever 10 is rotated to lift the holder 11 at a predetermined angle (FIG. 2b). Then, from this point, the bias force of the spring 16 acts, the rotary bearing 13 is instantly rotated in the counter-clockwise direction and the holder 11 is lifted to the standing position (FIG. 2c). In this state, the holder 11 is rotated 180°. Thereafter, the holder 11 is rotated against the bias force of the spring 16 and set within the cassette chamber 2, and as a result, reversal of the tape cassette 12 is completed and recording and reproduction on the opposite surface of the tape can be carried out.

Accordingly, the cassette can automatically be reversed without touching to the tape cassette in the cassette holder with such construction, so that the operation becomes simple as compared with a conventional tape cassette which should be picked up by fingers, the tape is not erroneously injured, and any disadvantage such as disuse of the tape cassette can be removed. Further, as compared with a complicated mechanism for a conventional multi-head and reversal of the tape feeding, the construction is substantially simplified, and as a result, the device is very cheap in cost and usable for superminiature tape recorders and the like which space is limited.

Figure 4A:
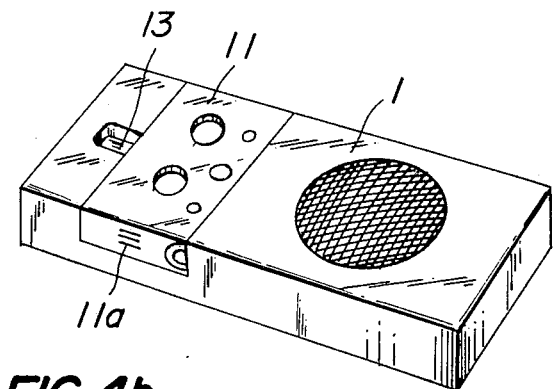
FIG. 4a is a perspective view showing a second embodiment of the cassette tape recorder having the cassette holder set in the cassette chamber.
Figure 4B:
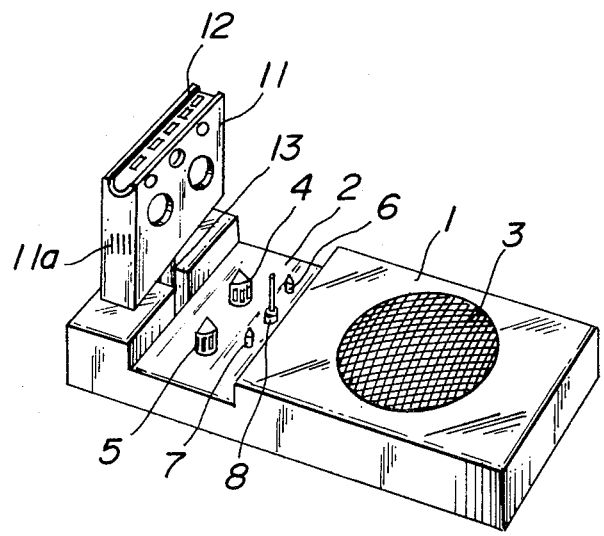
FIG. 4b is a perspective view showing the standing state of the cassette holder.

In the above embodiment, the cassette holder 11 is tumbled within the range of about 90°, but if there is no trouble in rotation for the purpose of reversing the holder 11, the angle can optionally be determined. Further, in the above embodiment, the bias force of the spring 16 is used for lifting the holder 11, but as shown in FIGS. 4a and 4b, a hook portion 11a is formed on both side surfaces of the holder 11 and the holder 11 is lifted by sandwiching with the fingers. Further, the above embodiment is provided with a shaft on the rear surface side of the cassette holder, but it may be provided on the opening side of the holder. In the above embodiment, when the holder is lifted by the action of the eject lever interlocking with the eject button, automatically rotated at 180° and even if the holder is reset in the cassette chamber, it is preferable to just bore a pair of drive shaft inserting holes, a pair of cassette guide pin inserting holes and a capstan shaft inserting hole on upper and lower surfaces of the holder. Further, when the holder is formed of transparent synthetic resin or the like, an inner cassette label can easily be read.

Figure 5A:
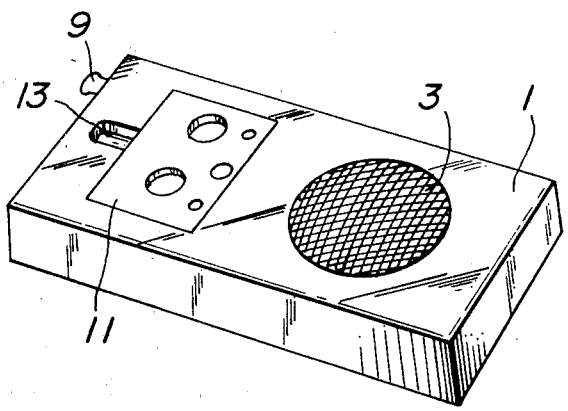
FIG. 5a is a perspective view showing a third embodiment of the cassette tape recorder having the cassette holder set in the cassette chamber.
Figure 5B:
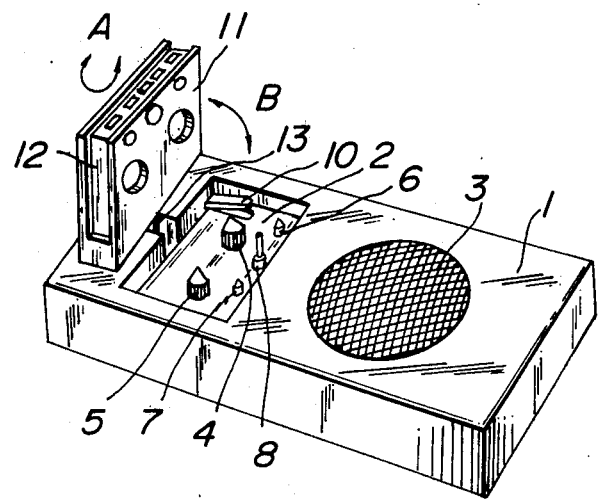
FIG. 5b is a perspective view showing the standing state of the cassette holder.

FIGS. 5a and 5b show another cassette holder in a tape recorder embodying the invention. In FIG. 5, in tape recorder main body 1 is provided with a cassette chamber 2, a speaker hole 3 and the like.

The cassette chamber 2 is provided with a pair of reel drive shafts 4, 5, cassette guide pins 6, 7 and a capstan shaft 8, and further provided with an eject lever 10 interlocked with an eject button 9.

Figure 6:
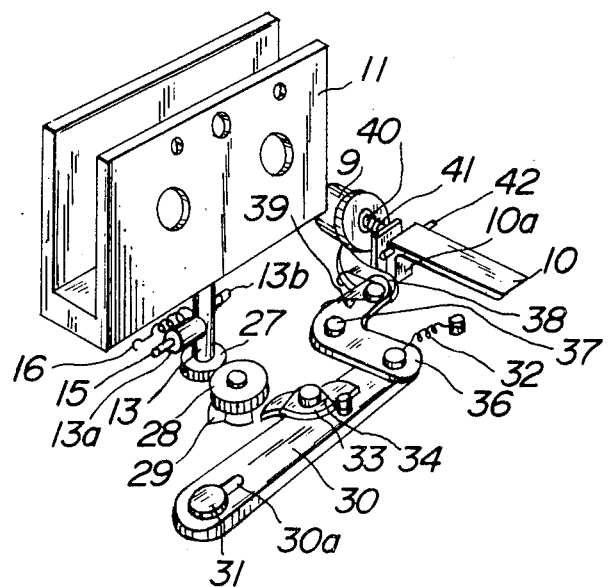
FIG. 6 is a perspective view showing a reversing mechanism of the cassette holder.
Figure 7:
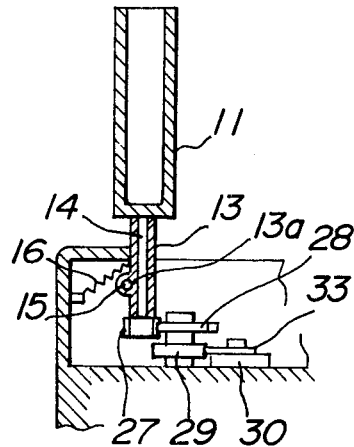
FIG. 7 is a partially sectional view showing a rotary bearing of the cassette holder.

The cassette chamber 2 is also provided with a detachable cassette holder 11. This holder 11 receives and holds a tape cassette 12. The holder 11 is supported by the rotary bearing 13, rotated in the direction of an arrow A and tumbled or swung in the direction of an arrow B within a range of about 90°. The reversal mechanism of the holder 11 is shown in detail in FIG. 6. In this case, the rotary bearing 13 for supporting the holder 11 is cylindrical as shown in FIG. 7, and the shaft 14 of the holder 11 is inserted into the bearing 13 so as to make its rotation in the direction of an arrow A possible. A boss 13a near one end of the rotary bearing 13 is supported by the pin 15 for swinging the holder 11 in the direction of the arrow B, i.e., from the standing position to a position in the cassette chamber 2, through a range of about 90°. Adjacent to the boss 13a of the rotary bearing 13, a spring boss 13b and between the boss 13b is connected to a spring 16 which extends to the inner wall surface of the cassette case main body 1. This spring 16 imposes a bias force, in the standing direction on the rotary bearing 13, so that this bias force acts instantly when the rotary bearing 13 stands at a predetermined angle, i.e., the rotary bearing 13 exceeds the dead point of the spring 16.

As the end of the shaft 14 of the cassette a gear 28 meshes at the time the holder 11 stands, with the pinion 27. The gear 28 is coaxially provided with a wheel gear 29, and the pinion 27 is rotated 180° upon rotation of the wheel gear 29 by a predetermined angle so as to reverse the holder 11.

A lever 30 is provided adjacent to the above wheel gear 29. This lever 30 is provided with a long hole 30a in the axial direction at one end, and a pin 31 is inserted in this long hole in the axial direction so as to move freely. Further, the other end of the lever 30 is provided with a spring 32 which always biases the lever as illustrated.

Figure 8:
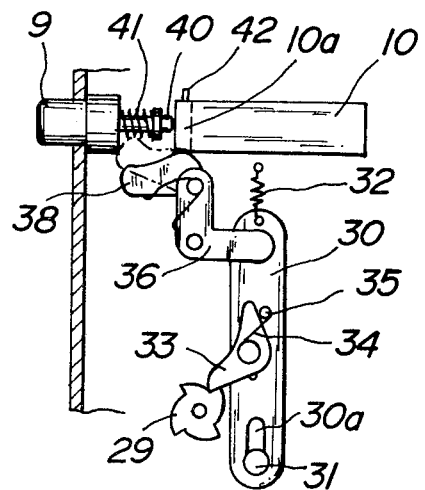
FIG. 8 is a plan view showing a reversing drive mechanism of the cassette holder.

A claw 33 is secured in the middle portion of the lever 30. This claw 33 is engaged with the wheel gear 29 as shown in FIG. 8 for rotating the wheel gear 29 by a predetermined angle when the lever 30 is moved against the bias force of the spring 32. In this case, the claw 33 is to contact the pin 35 by the clockwise bias force of the spring 34 and transmits its driving force to the wheel gear 29 only when the movement is in the direction against the bias force of the spring 32 of the lever 30.

The other end of the lever 30 is secured an L-shaped lever 36. The lever 36 is rotatably supported by the pin 37 at the bent portion. Further, the lever 36 is provided with an operational member 38. This operational member 38 is always biased in the clockwise direction by the spring 39.

On the other hand, the eject button 9 is provided with an operational shaft 40. This shaft 40 is supported by a bearing through a spring 41 as shown in FIG. 8 and moved against the bias force of the spring 41 by the push operation of the eject button 9. The end of the shaft 40 is provided the eject lever 10. The lever 10 forms a bent portion 10a at the end opposite the said shaft 40. The bent portion 10a is rotatable around the pin 42, and if the bent portion 10a is pressed by the movement of the shaft 40, the holder 11 is forcibly raised to a predetermined angle, i.e., the position where the bias force of the spring 16 is influenced. In this case, the lever 10 makes the bent portion 10a a stopper made into contact with the operational member 38 as shown in FIG. 8. Further, when the stopper of the operational member 38 is released by rotating the lever 10, the operational member 38 is made into contact with the eject button 9 as shown by a broken line shown in FIG. 8.

In this cassette reversing device, when the tape cassette 12 is put in the cassette holder and set in the cassette chamber 2, but it becomes necessary to reverse the tape cassette 12 from that state, if the eject button 9 is pushed, the eject lever 10 is rotated and the holder 11 is raised to a predetermined angle. Then, from this point, the bias force of the spring 16 acts to rotate the bearing 13 in the counterclockwise direction instantly and the holder 11 is raised to the standing position. Further, according to the push operation of the eject button 9, the eject lever 10 is rotated to release the stopper from the operational member 38 to the bent portion 10a of the lever 10 so the member 38 makes contact with the eject button 9 as shown by a broken line shown in FIG. 8. The eject button 9 may be regarded as an actuating member. Pushing it as described may be regarded as a first operation.

Therefore, in this state, if the eject button 9 is again pushed, the operational member 38 is pushed and the lever 36 is rotated in the clockwise direction and the lever 30 is linearly moved against the bias force of the spring 32. When the eject button 9 is pushed again, this may be regarded as a second operation thereof. The claw 33 therefore rotates the wheel gear 29 by a predetermined angle, further rotates the pinion 27 through the gear 28 and rotates the holder 11 180°. And, thereafter, if the holder 11 is set in the cassette chamber 2 against the bias force of the spring 16, the reversal of the tape cassette 12 is completed and recording and reproduction on the opposite surface of the tape becomes possible. In the above described embodiment, the cassette holder 11 has a role of the cassette lid, but as shown in FIGS. 9a and 9b, it is preferable to provide a cassette lid 43 separately. In this case, the cassette holder 11 simply holds the lower side portion of the tape cassette as illustrated. It is a matter of course in this case that the holder 11 is made to stand in conjunction with the eject lever 10 and at the same time the cassette lid 43 is opened. The members 27 to 40 or parts thereof may be regarded as a coupling arrangement between the button 9 and the holder 11.

Figure 11:
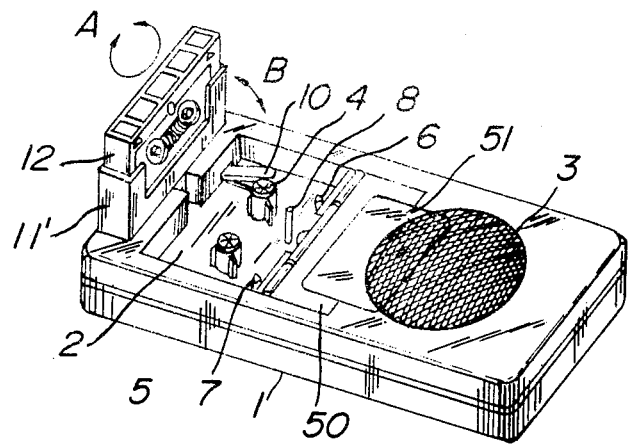
FIG. 11 is a perspective view showing the standing state of the cassette holder shown in FIG. 10.

A fifth embodiment of the invention will be explained with reference to FIGS. 10 and 11. In this embodiment reference numeral 1 is a tape recorder main body, and this tape recorder main body 1 is provided with a cassette chamber 2, a speaker 3 and the like on the upper surface, and an internal microphone, volume and operation button (not shown), respectively.

The cassette chamber 2 is provided with a pair of reel drive shafts 4, 5, a pair of cassette guide pins 6, 7 and a capstan shaft 8 and further provided with an eject lever 10 interlocked with an eject button 9.

On the other hand, the cassette chamber 2 is provided with a detachable cassette holder 11 for automatically reversing the cassette 12. Thus, the holder 11 is pocket-like for causing a part of the cassette 12 to project therefrom. Further, this holder 11 is supported by a rotary bearing 13 for rotating in the direction of an arrow A and tumbling or swinging in the direction of an arrow B within the range of about 90°. The reversing mechanism of the holder 11 is such that a rotary shaft 14 of the holder 11 is inserted into the rotary bearing 13 so as to make the rotation in the direction of the arrow A possible. Further, the rotary bearing 13 is provided with a boss 13a at the end portion, and this boss 13a is supported by a pin 15 (FIGS. 12 and 13) so as to tumble or swing the holder 11 from the position of being supported by the pin 15 towards the direction of the above arrow B, i.e., the standing state to the setting state in the chamber 2 within the range of about 90°. The rotary bearing 13 is provided with a spring boss 13b, and a spring 16 is extended between the boss 13b and the cassette case main body 1. This spring 16 has a bias force in the standing direction to the rotary bearing 13, and this bias force is instantly effected from the point that the rotary bearing 13 becomes a predetermined angle, i.e., the point of exceeding the dead point of the spring 16.

At the end of the shaft 14 of the above cassette holder 11' is secured a pinion 27. A gear 28 meshes with the holder 11' corresponding to the pinion 27. This gear 28 is coaxially provided with a wheel gear 29, and the pinion 27 is rotated by the rotation of this wheel gear 29 at a predetermined angle and further reversely driven the holder 11'.

A lever 30 is provided adjacent to the wheel gear 29. This lever 30 is formed with an elongate hole 30a in the axial direction at one end, and a pin 31 is inserted into this elongate hole 30a so as to be movable in the axial direction. Further, at the other end of the lever 30 is provided a spring 32 so as to bias to the state as illustrated constantly.

In the middle portion of the lever 30 is secured a claw 33. This claw 33 is engaged with the wheel gear 29, and when the lever 30 is moved in the direction against the bias force of the spring 32, the wheel gear 29 is rotated by a predetermined angle. In this case, the claw 33 is normally biased into contact with a pin 35 by the biasing force in the clockwise direction of the spring 34, and only when moving in the direction against the bias force of the spring 32 of said lever 30, the drive force of the wheel gear 29 is transmitted.

To the other end of the lever 30 is secured an L-shaped lever 36. This lever 36 is rotatably supported by a pin 37 at the bend portion. Further, to this lever 36 is secured an operational member 38. This operational member 38 is always biased in the clockwise direction by a spring 39.

Figure 12:
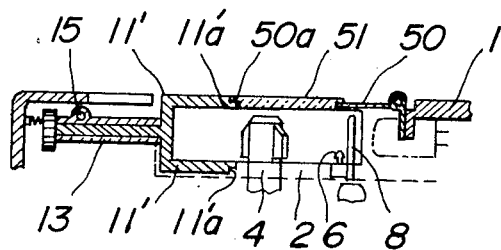
FIG. 12 is a partially sectional view showing the state of setting the cassette holder in the cassette chamber.
Figure 13:
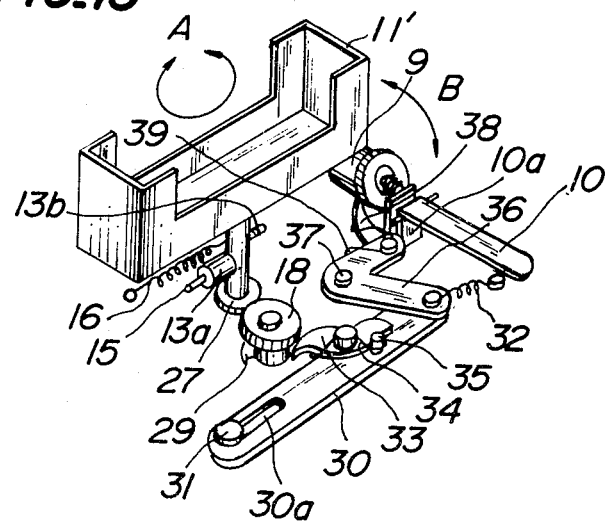
FIG. 13 is a perspective view showing the reversing drive mechanism of the cassette holder shown in FIG. 10.

On the other hand, a lid 50 for closing the cassette chamber 2 is conformity with the holder 11' stood in the cassette chamber 2 is formed in the shape of the holder 11'. That is, a lid 50 is formed to a convex shape for filling the concave portion of the holder 11', and there is formed a window portion 51 formed with a transparent member such as plastic, glass or the like as a projecting portion. The lid 50 and the holder 11' enhance airtightness by engaging an engaging edge 50a of the lid 50 with a step portion 11'a provided on the engaging edge of the holder 11' as shown in FIG. 12.

In addition, although not illustrated a click mechanism is provided between the lid 50 and the cassette chamber 2 so as not to open the lid by vibration or the like.

In such cassette reversing device, therefore, when the tape cassette 12 is charged or loaded in the cassette holder and should be reversed from its setting in the cassette chamber 2, if the eject button 9 is pushed, the eject lever 10 is rotated to push up the lid 50 to raise the holder 11' to a predetermined angle. Then, the lid 50 is rotated about 90° as shown in FIG. 11 and the holder 11' becomes stood. Further, when the eject lever 10 is rotated by the push operation of the eject button 9, the operational member 38 is released from the stopper up to the bent portion 10a of the lever 10 and its end makes contact with the eject button 9.

Therefore, if the eject button 9 is again pushed in this state, the operational member 38 is pushed, the lever 36 is rotated in the clockwise direction, and the lever 30 is linearly moved against the bias force of the spring 32. As a result, the claw 33 rotates the wheel gear 29 by a predetermined angle, rotates the pinion 27 through the gear 28 and further rotates the holder 11' by 180°. Thereafter, if the holder 11' is set in the cassette chamber 2 against the bias force of the spring 16, reversion of the tape cassette 12 is completed. After completed the reversion of the cassette 12, the cassette is completely sealed by the holder 11' and the lid 50 by closing the lid 50 with hands.

According to this construction, the cassette is automatically reversed without touching the tape cassette in the cassette holder, so that the operation becomes simple, the tape is prevented from any injury, and any disadvantage such as disuse of the tape casette caused by the injury can be removed as compared with the conventional apparatus. Particularly, since the cassette chamber can be sealed with the holder and the lid, there is no possibility of entering dust and dirt therein, and the lid having functionally excellent construction can be provided.

As described above, the present invention can provide a tape recorder having a simple and cheap cassette reversing device which does not require to touch the tape cassette with hands for reversing the cassette, with a fine view and reliable construction.

Moreover, according to the invention, the reversion of the cassette can be carried out without touching the tape cassette and is simple in construction and cheap in cost.

What is claimed is:

1. A cassette tape recorder comprising a housing body, a cassette chamber in the body, a cassette holder for holding a tape cassette therein and movably mounted on the housing body for movement into and out of the chamber, at least one magnetic head for contacting tape in the cassette when the holder holds a cassette in the chamber, means for driving a magnetic tape in the tape cassette when the holder holds a cassette in the chamber, and a urging means for reversing the tape cassette when held in the cassette holder; said reversing device including actuating means for actuating a holder movement and coupling means coupling the actuating means to the holder for moving the holder out of the chamber in response to a first operation of the actuating means and for rotating the thus moved holder 180° in response to a second operation of said actuating means, whereupon the cassette holder may be reinserted into the chamber and the actuating means again be actuated.

2. A cassette type tape recorder as claimed in claim 1, wherein the coupling means includes an articulatable bearing for swinging the holder into and out of the cassette chamber and at least a drive shaft hole and a capstan hole are bored on upper and lower surfaces of the cassette holder.

3. A cassette type tape recorder as claimed in claim 1, wherein at least a portion of the cassette holder corresponding to a central portion of a tape cassette held therein is transparent.

4. A cassette type tape recorder as claimed in claim 1, wherein the coupling means includes an articulatable bearing for swinging the cassette holder into and out of the chamber, and said coupling means includes means for rotating the holder and an eject mechanism for lifting said bearing from the chamber, said rotating means being engaged for operation by said eject mechanism only after the eject mechanism has lifted the bearing.

5. A cassette type tape recorder as claimed in claim 1, wherein a portion of the cassette holder is adapted to receive at least a pair of drive shafts, and wherein said body includes a lid for covering the portion adapted to receive the shafts.

6. A recorder as in claim 1, wherein said coupling means includes eject means coupled to the actuating means when the holder is in the chamber for moving the holder from the chamber, and rotating means operatively coupled to the actuating means only after said actuating means has caused the eject means to move the holder from the chamber for rotating the holder.

7. A recorder as in claim 6, wherein said eject means includes a lift lever coupled to the actuating means to be moved thereby for lifting the holder.

8. A recorder as in claim 1, wherein said coupling means includes eject means coupled to the actuating means when the holder is in the chamber for moving the holder from the chamber, and rotating means coupled to the eject means when the holder is in the chamber and moving in response to the eject means moving the holder out of the chamber into engagement with the actuating means for rotating the holder in response to movement of the actuating means.

9. A recorder as in claim 8, wherein said rotating means includes a link movable into engagement with the actuating means after the actuating means has moved said eject means, a linkage movable by said link when the actuating means moves the link, a first wheel turnable by said linkage, and a second wheel rotatable with said holder and engagable with said first wheel when the holder is out of the chamber.

10. A recorder as in claim 9, wherein said eject means includes a bearing, and wherein said rotating means includes a shaft coupled to the bearing and rotary drive means responsive to movement of the actuating means when the holder has been moved out of the chamber.

11. A recorder as in claim 10, wherein said eject means includes a lift lever coupled to the actuating means to be moved thereby for lifting the holder.

12. A recorder as in claim 9, wherein said link is a first pawl, said linkage includes a lever coupled to the pawl, a translatory movable member coupled to the lever, a second pawl on said member, and a ratch wheel coupled to the first wheel and couplable to said second pawl for movement thereby when said actuating means moves said first pawl.

13. A recorder as in claim 12, wherein said eject means includes a lift lever coupled to the actuating means to be moved thereby for lifting the holder.

14. A recorder as in claim 9, wherein said eject means includes a lift lever coupled to the actuating means to be moved thereby for lifting the holder.

15. A recorder as in claim 8, wherein said eject means includes a bearing, and wherein said rotating means includes a shaft coupled to the bearing and rotary drive means responsive to movement of the actuating means when the holder has been moved out of the chamber.

16. A recorder as in claim 15, wherein said link is a first pawl, said linkage includes a lever coupled to the pawl, a translatory movable member coupled to the lever, a second pawl on said member, and a ratch wheel coupled to the first wheel and couplable to said second pawl for movement thereby when said actuating means moves said first pawl.

17. A recorder as in claim 16, wherein said eject means includes a lift lever coupled to the actuating means to be moved thereby for lifting the holder.

18. A recorder as in claim 15, wherein said eject means includes a lift lever coupled to the actuating means to be moved thereby for lifting the holder.

19. A recorder as in claim 8, wherein said eject means includes a lift lever coupled to the actuating means to be moved thereby for lifting the holder.

20. A recorder as in claim 1, wherein the holder holds only a lower portion of a cassette and leaves part of the sides and the majority of the faces of the cassette clear.

* * * * *